US012665831B2

(12) United States Patent
Zhang

(10) Patent No.: US 12,665,831 B2
(45) Date of Patent: Jun. 23, 2026

(54) TRANSMISSION QUALITY DETECTION METHOD, APPARATUS, AND SYSTEM

(71) Applicant: HUAWEI TECHNOLOGIES CO., LTD., Shenzhen (CN)

(72) Inventor: Jie Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 692 days.

(21) Appl. No.: 17/896,146

(22) Filed: Aug. 26, 2022

(65) Prior Publication Data

US 2022/0417128 A1 Dec. 29, 2022

Related U.S. Application Data

(63) Continuation of application No. PCT/CN2020/119014, filed on Sep. 29, 2020.

(30) Foreign Application Priority Data

Feb. 29, 2020 (CN) .......................... 202010132979.3

(51) Int. Cl.
*H04L 43/106* (2022.01)
*H04L 43/0882* (2022.01)

(52) U.S. Cl.
CPC ........ *H04L 43/106* (2013.01); *H04L 43/0882* (2013.01)

(58) Field of Classification Search
CPC ............... H04L 43/0894; H04L 63/101; H04L 43/0882; H04L 43/106; H04L 43/0829; H04L 43/12
See application file for complete search history.

(56) References Cited

U.S. PATENT DOCUMENTS 9,942,175 B1 * 4/2018 Mizrahi .............. H04L 49/9057
11,575,475 B2 * 2/2023 Dudda .............. H04W 28/0278
(Continued)

FOREIGN PATENT DOCUMENTS

CN 101605020 A 12/2009
CN 102195819 A 9/2011
(Continued)

OTHER PUBLICATIONS

K. Hedayat et al: "A Two-Way Active Measurement Protocol (TWAMP)", Network Working Group, rfc5357, Category: Standards Track, Oct. 2008, 26 pages.
(Continued)

*Primary Examiner* — Jason E Mattis
*Assistant Examiner* — Bao G Nguyen

(57) ABSTRACT

A transmission quality detection method, apparatus, and system are disclosed. A first node is configured to send a periodic packet to a second node, determine a first data volume of a target service flow transmitted by the first node in a time interval for two consecutive times of transmitting the periodic packet, and send a first statistical packet including the first data volume to the controller. The second node is configured to determine a second data volume of the target service flow transmitted by the second node in the time interval for two consecutive times of transmitting the periodic packet, and send a second statistical packet including the second data volume to the controller. The controller is configured to determine, based on the first data volume and the second data volume, transmission quality between the first node and the second node.

10 Claims, 6 Drawing Sheets

(56) References Cited

U.S. PATENT DOCUMENTS

| | | | | |
|---|---|---|---|---|
| 2008/0248756 | A1* | 10/2008 | Yi | H04B 7/2612 |
| | | | | 455/67.11 |
| 2010/0135180 | A1 | 6/2010 | Morinaga et al. | |
| 2015/0023214 | A1* | 1/2015 | Soneda | H04L 41/12 |
| | | | | 370/254 |
| 2019/0034003 | A1* | 1/2019 | Zeng | G06F 3/04164 |
| 2019/0141059 | A1* | 5/2019 | Shimizu | H04L 63/1441 |
| 2021/0036960 | A1* | 2/2021 | Xu | H04L 67/55 |
| 2021/0336960 | A1* | 10/2021 | Sandler | H04L 12/413 |

FOREIGN PATENT DOCUMENTS

| | | | |
|---|---|---|---|
| CN | 102217236 | A | 10/2011 |
| CN | 102404170 | A | 4/2012 |
| CN | 102904775 | A | 1/2013 |
| CN | 102946330 | A | 2/2013 |
| CN | 104348678 | A | 2/2015 |
| CN | 106301987 | A | 1/2017 |
| CN | 108259208 | A | 7/2018 |
| CN | 108449230 | A | 8/2018 |
| WO | 2011003478 | A1 | 1/2011 |
| WO | 2018014928 | A1 | 1/2018 |
| WO | 2018094616 | A1 | 5/2018 |

OTHER PUBLICATIONS

S. Bryant er al, UDP Return Path for Packet Loss and Delay Measurement for MPLS Networks, rfc 7876, Jul. 2016, 10 pages.

F. Brockners et al., Data Fields for In-situ OAM; draft-ietf-ippm-ioam-data-07, Sep. 11, 2019, 41 pages.

H. Song, Ed., In-situ Flow Information Telemetry; draft-song-opsawg-ifit-framework-07, Nov. 4, 2019, 19 pages.

ITU-T G.8013/Y.1731 Series G: Transmission Systems and Media, Digital Systems and Networks Packet over Transport aspects Ethernet over Transport aspects Series Y: Global Information Infrastructure, Internet Protocol Aspects and Next-Generation Networks Internet protocol aspects Operation, administration and maintenance, OAM functions and mechanisms for Ethernet based networks, Telecommunication Standardization Sector of ITU, Aug. 2019, 102 pages.

International Search Report and Written Opinion issued in PCT/CN2020/119014, dated Dec. 30, 2020, 9 pages.

Office Action issued in CN202010132979.3, dated May 20, 2022, 14 pages.

Extended European Search Report issued in EP20921110.1, dated Jun. 12, 2023, 9 pages.

* cited by examiner

TRANSMISSION QUALITY DETECTION METHOD, APPARATUS, AND SYSTEM

CROSS-REFERENCE TO RELATED APPLICATIONS

This application is a continuation of International Application No. PCT/CN2020/119014, filed on Sep. 29, 2020, which claims priority to Chinese Patent Application No. 202010132979.3, filed on Feb. 29, 2020. The disclosures of the aforementioned applications are hereby incorporated by reference in their entireties.

TECHNICAL FIELD

This application relates to the field of communication technologies, and in particular, to a transmission quality detection method, apparatus, and system.

BACKGROUND

With development of network technologies, some service flows have a high requirement on transmission quality. Therefore, the transmission quality (where the transmission quality may include packet loss information or the like) needs to be learned of in time, to provide matching transmission quality for these service flows.

In a related technology, when transmission quality of a service flow between two nodes in a network is detected, a head node in the two nodes sends a detection probe to a tail node in the two nodes based on a preset periodicity. The detection probe includes a first quantity of data packets that are sent by the head node to the tail node between the last time of sending the detection probe and a current time of sending the detection probe. After receiving the detection probe sent by the head node, the tail node may obtain a second quantity of data packets received from the head node between the last time of receiving the detection probe and a current time of receiving the detection probe. Then, the tail node generates a response packet, and sends the response packet to the head node. The response packet includes the first quantity and the second quantity. The head node determines a difference between the first quantity and the second quantity in the response packet, to obtain packet loss information of the service flow between the two nodes.

According to the related technology, when transmission quality between the head node and the tail node is poor, if the response packet sent by the tail node to the head node is lost, the packet loss information cannot be determined, and consequently detection efficiency is low.

SUMMARY

This application provides a transmission quality detection method, apparatus, and system, to improve detection efficiency.

According to a first aspect, a transmission quality detection system is provided. The system includes a first node configured to send a periodic packet to a second node. The periodic packet is a packet periodically sent by a node that generates the periodic packet. The first node is further configured to: determine a first data volume of a target service flow transmitted by the first node in a time interval for two consecutive times of transmitting the periodic packet, and send a first statistical packet to the controller. The first statistical packet includes the first data volume. The second node is configured to: determine a second data volume of a target service flow transmitted by the second node in the time interval for two consecutive times of transmitting the periodic packet, and send a second statistical packet to the controller. The second statistical packet includes the second data volume. The controller is configured to determine, based on the first data volume in the first statistical packet and the second data volume in the second statistical packet, transmission quality between the first node and the second node.

In the solution shown in this application, the first node may be a network device that starts monitoring traffic, the second node may be a network device that stops monitoring traffic, the first node may be a head node of a transmission link, or may be an intermediate node of a transmission link, and the second node may be a head node of a transmission link, or may be an intermediate node of a transmission link. The first node is configured to send the periodic packet to the second node. The periodic packet is the packet periodically sent by the node that generates the periodic packet. When the first node transmits the periodic packet for two consecutive times (where transmitting the periodic packet for two consecutive times is sending the periodic packet to the second node for two consecutive times or receiving a periodic packet of an upstream node for two consecutive times), the first node may determine the first data volume of the target service flow transmitted by the first node in the time interval between the two consecutive times. The first data volume may include a quantity of transmitted data packets or a quantity of bytes of transmitted data packets. Then, the first node carries the first data volume in the first statistical packet, and sends the first statistical packet to the controller.

The second node may receive the periodic packet sent by the first node. When the second node transmits the periodic packet for two consecutive times (where transmitting the periodic packet for two consecutive times is receiving the periodic packet sent by the first node for two consecutive times or sending the periodic packet to a downstream node for two consecutive times), the second node may determine the second data volume of the target service flow transmitted by the second node in the time interval between the two consecutive times. The second data volume may include a quantity of the transmitted data packets or a quantity of bytes of the transmitted data packets. Then, the second node carries the second data volume in the second statistical packet, and sends the second statistical packet to the controller.

The controller may determine the transmission quality between the first node and the second node based on the first data volume included in the first statistical packet and the second data volume included in the second statistical packet. The transmission quality may include packet loss information and/or flow rate information. In this way, because there is no need to send a quantity of data packets in a detection probe sent by the first node to the second node, and the second node does not need to send a response packet to the first node, even if network quality between the first node and the second node is poor, transmission quality can still be obtained, and detection efficiency may be improved.

In a possible implementation, when the first node is used as the node that generates the periodic packet, the first node may be configured to: generate the periodic packet based on a detection period, and send the periodic packet to the second node. Alternatively, when the first node is used as the node that generates the periodic packet, the first node may be configured to: obtain a pre-stored periodic packet based on a detection period, and send the periodic packet to the second node. Alternatively, when the node that generates the periodic packet is an upstream node of the first node, the first node may receive a periodic packet periodically sent by the upstream node, and send the periodic packet to the second node. The upstream node is a general term of a node upstream of the first node. In this way, it can be ensured as much as possible that lengths of all periods statically obtained are the same.

In a possible implementation, the controller is further configured to send detection information to the first node and/or the second node. The detection information includes an access control list (ACL) rule of the target service flow. The ACL rule may include one or more of at least one tuple in a 5-tuple, an interface identifier, or a virtual routing and forwarding (VRF) identifier, where the at least one tuple includes a destination Internet Protocol (IP) address. The first node and the second node may determine a data packet of the target service flow based on the ACL rule. In this way, the controller may specify a service flow for which statistics need to be collected.

In a possible implementation, the second node may record a time point at which the periodic packet is transmitted each time. If the periodic packet is not transmitted when a duration from the time point reaches a target duration, the second node may generate a third statistical packet. The third statistical packet carries indication information indicating that the periodic packet is abnormal, a timestamp for generating the third statistical packet, and a third data volume of the target service flow transmitted by the second node between the last time of transmitting the periodic packet and the timestamp. Then, the second node sends the third statistical packet to the controller.

Alternatively, the second node may record a time point at which the periodic packet is transmitted each time. If a duration from the time point reaches a target duration, when the second node transmits the periodic packet again, the second node may generate the third statistical packet. The third statistical packet carries indication information indicating that the periodic packet is abnormal, a timestamp for generating the third statistical packet, and a third data volume of the target service flow transmitted by the second node between the last time of transmitting the periodic packet and the timestamp. Then, the second node sends the third statistical packet to the controller. In this way, even if the network quality is poor and the periodic packet is lost, the second node can still provide the statistical packet in this period of time for determining the transmission quality.

In a possible implementation, the controller receives the third statistical packet sent by the second node, obtains a timestamp for generating the third statistical packet from the third statistical packet, and obtains a timestamp for receiving the second statistical packet for the last time. The controller combines the two timestamps into a detection time period.

Then, the controller may determine a first statistical packet corresponding to the second statistical packet and received for the last time, and the controller determines a first statistical packet that is within a duration of the detection time period after the timestamp of the first statistical packet as a first statistical packet corresponding to the detection time period.

The controller may use the third data volume in the third statistical packet and a first data volume in the first statistical packet corresponding to the detection time period (where the first data volume in the first statistical packet corresponding to the detection time period is a data volume obtained by adding first data volumes in a plurality of first statistical packets corresponding to the detection time period), and determines the transmission quality between the first node and the second node. In this way, even if the network quality is poor and the periodic packet is lost, the transmission quality can still be determined, and impact of the network quality on statistical accuracy is reduced.

In a possible implementation, the controller may further send the detection period to the first node. In this way, the first node may send the periodic packet to the second node based on the detection period.

In a possible implementation, the controller may further send a packet type of the periodic packet to the first node, where the packet type may be any one of a heartbeat packet type, an interior gateway protocol hello packet type, or a bidirectional forwarding periodic packet type. The first node may generate a periodic packet of the packet type based on the detection period, and send the periodic packet to the second node; or the first node may obtain a pre-stored periodic packet of the packet type based on the detection period, and send the periodic packet to the second node. Alternatively, the first node identifies a periodic packet of the packet type from packets received by the upstream node, to define the time interval for two consecutive times of transmitting the periodic packet. In this way, the controller may indicate the packet type of the periodic packet used by the first node, so that the first node identifies the periodic packet.

In a possible implementation, the controller may further send a packet type of the periodic packet to the second node, where the packet type may be any one of the heartbeat packet type, the interior gateway protocol hello packet type, or the bidirectional forwarding periodic packet type. The second node may identify the periodic packet of the packet type from a received packet based on the packet type. In this way, the controller may indicate the packet type of the periodic packet used by the second node, so that the second node identifies the periodic packet.

According to a second aspect, a transmission quality detection method is provided. The method is applied to a network node, where the network node may be a network device that starts monitoring traffic, or may be a network device that stops monitoring traffic. The method includes: transmitting a periodic packet, determining a data volume of a target service flow transmitted by the network node in a time interval for two consecutive times of transmitting the periodic packet, where the data volume includes a quantity of data packets and/or a quantity of bytes of the data packets. Sending a statistical packet to a controller, where the statistical packet includes the data volume.

In the solution shown in this application, the network node may transmit the periodic packet. When the periodic packet is transmitted for the $i^{th}$ time, the network node may start to count the data volume of the target service flow. When the periodic packet is transmitted for the (i+1)th time, the network node determines a data volume of the target service flow within a time interval for the two consecutive times of transmitting the periodic packet. The data volume may include a quantity of data packets and/or a quantity of bytes of the data packets.

Then, the network node may send the statistical packet to the controller, where the statistical packet includes the data volume of the target service flow. In this way, the network node may send a statistical packet obtained each time to the controller. The controller may determine the transmission quality based on the data volume in the statistical packet. In this way, because there is no need to send a quantity of data packets in a detection probe sent by the first node to the second node, and the second node does not need to send a response packet to the first node, even if network quality between the first node and the second node is poor, transmission quality can still be obtained, and detection efficiency may be improved. The first node may be a network device that starts monitoring traffic, and the second node may be a network device that stops monitoring traffic.

In a possible implementation, when the network node is the network device that starts monitoring traffic, the network node may be referred to as the first node for short. The first node may receive a periodic packet periodically sent by an upstream node, and then send the periodic packet to the second node. Alternatively, the first node may generate the periodic packet based on a detection period, and send the periodic packet to the second node. Alternatively, the first node may obtain a stored periodic packet based on a detection period, and send the periodic packet to the second node. In this way, it is equivalent to that the periodic packet is periodically sent between the first node and the second node, so that a statistical duration corresponding to each statistical packet may be basically the same, and accuracy of determining transmission quality is improved.

In a possible implementation, when the network node is the network device that stops monitoring traffic, the network node may be referred to as the second node for short. The second node transmits the periodic packet sent by the first node, and the second node may record a time point at which the periodic packet is transmitted each time. If the periodic packet is not transmitted when a duration from the time point reaches a target duration, the second node may generate a third statistical packet. The third statistical packet carries indication information indicating that the periodic packet is abnormal, a timestamp for generating the third statistical packet, and a third data volume of the target service flow transmitted by the second node between the last time of transmitting the periodic packet and the timestamp. Then, the second node sends the third statistical packet to the controller.

Alternatively, the second node may record a time point at which the periodic packet is transmitted each time. If a duration from the time point reaches a target duration, when the second node transmits the periodic packet again, the second node may generate the third statistical packet. The third statistical packet carries indication information indicating that the periodic packet is abnormal, a timestamp for generating the third statistical packet, and a third data volume of the target service flow transmitted by the second node between the last time of transmitting the periodic packet and the timestamp. Then, the second node sends the third statistical packet to the controller. In this way, even if the network quality is poor and the periodic packet is partially lost, the second node can still provide the statistical packet in this period of time for determining the transmission quality.

In a possible implementation, when the network node is the first node, the first node may further receive a detection period sent by the controller. In this way, the controller can control a statistical period, so that transmission quality detection is more flexible.

In a possible implementation, the network node may further receive detection information sent by the controller. The detection information may include an ACL rule of the target service flow, and the ACL rule may include one or more of at least one tuple in a 5-tuple, an interface identifier, or a VRF identifier, where the at least one tuple includes a destination IP address. The network node may determine the data volume of the target service flow based on the ACL rule. In this way, a to-be-detected service flow can be flexibly controlled.

In a possible implementation, when the network node is the first node, the first node may further receive a packet type of the periodic packet sent by the controller, where the packet type is any one of a heartbeat packet type, an interior gateway protocol hello packet type, or a bidirectional forwarding periodic packet type. The first node may receive a periodic packet of the packet type periodically sent by the upstream node, and then send the periodic packet to the second node. Alternatively, the first node may obtain a stored periodic packet based on the detection period, and send the periodic packet to the second node. Alternatively, the first node may generate the periodic packet based on the detection period, and send the periodic packet to the second node. In this way, the controller may indicate the packet type, so that flexibility of transmission quality detection is higher.

According to a third aspect, a transmission quality detection method is provided, where the method is applied to a controller. The method includes: A controller receives a first statistical packet sent by a first node, and receives a second statistical packet sent by a second node, where the first statistical packet includes a first data volume of a target service flow transmitted by the first node within a time interval for two consecutive times of transmitting the periodic packet by the first node, and the second statistical packet includes a second data volume of the target service flow transmitted by the second node within the time interval for two consecutive times of transmitting the periodic packet by the second node. Data information includes a quantity of data packets and/or a quantity of bytes of the data packets, and the periodic packet is sent by the first node to the second node, the periodic packet is a packet periodically sent by a node that generates the periodic packet. Determining, based on the first data volume in the first statistical packet and the second data volume in the second statistical packet, transmission quality between the first node and the second node.

In the solution shown in this application, the first node may be the network device that starts monitoring traffic, and the second node may be the network device that stops monitoring traffic. The controller may receive the first statistical packet sent by the first node, and receive the second statistical packet sent by the second node. The first statistical packet includes a first data volume of a target service flow transmitted by the first node within a time interval for two consecutive times of transmitting the periodic packet by the first node, and the second statistical packet includes the second data volume of the target service flow transmitted by the second node within a time interval for two consecutive times of receiving the periodic packet by the second node. Data information includes a quantity of data packets and/or a quantity of bytes of the data packets, and the periodic packet is sent by the first node to the second node, the periodic packet is a packet periodically sent by a node that generates the periodic packet. Then, the controller may determine the transmission quality between the first node and the second node by using the first data volume in the first statistical packet and the second data volume in the second statistical packet in each detection period. The transmission quality includes packet loss information and/or flow rate information. In this way, because there is no need to send a quantity of data packets in a detection probe sent by the first node to the second node, and the second node does not need to send a response packet to the first node, even if network quality between the first node and the second node is poor, transmission quality can still be obtained, and detection efficiency may be improved.

In a possible implementation, the controller may further send a packet type of the periodic packet to the first node and/or the second node, where the packet type may be any one of a heartbeat packet type, an interior gateway protocol hello packet type, or a bidirectional forwarding periodic packet type. The packet type is used by the first node and/or the second node to obtain the periodic packet indicated by the packet type. In this way, the controller may deliver the packet type, so that transmission quality detection is more flexible.

In a possible implementation, the controller receives a third statistical packet sent by the second node, where the third statistical packet includes abnormal indication information of the periodic packet, a timestamp, and a third data volume of the target service flow that is transmitted by the second node between the last time of transmitting the periodic packet by the second node and the timestamp, and the timestamp is a timestamp at which the third statistical packet is generated. The controller obtains a timestamp for generating the third statistical packet from the third statistical packet, and obtains a timestamp for receiving the second statistical packet for the last time. The controller combines the two timestamps into a detection time period.

Then, the controller may determine a first statistical packet corresponding to the second statistical packet and received for the last time, and the controller determines a first statistical packet that is within a duration of the detection time period after the timestamp of the first statistical packet as a first statistical packet corresponding to the detection time period.

The controller may use the third data volume in the third statistical packet and a first data volume in the first statistical packet corresponding to the detection time period (where the first data volume in the first statistical packet corresponding to the detection time period is a data volume obtained by adding first data volumes in a plurality of first statistical packets corresponding to the detection time period), and determines the transmission quality between the first node and the second node. In this way, even if the network quality is poor and the periodic packet is lost, the transmission quality can still be determined, and impact of the network quality on statistical accuracy is reduced.

According to a fourth aspect, a transmission quality detection apparatus is provided. The apparatus includes one or more modules, and the one or more modules are configured to implement the transmission quality detection method according to the second aspect.

According to a fifth aspect, a transmission quality detection apparatus is provided. The apparatus includes one or more modules, and the one or more modules are configured to implement the transmission quality detection method according to the third aspect.

According to a sixth aspect, this application provides a transmission quality detection computing device. The computing device includes a processor and a memory, where the memory stores computer instructions, and the processor executes the computer instructions, to enable the computing device to implement the method according to the first aspect and the possible implementations of the second aspect.

According to a seventh aspect, this application provides a transmission quality detection computing device. The computing device includes a processor and a memory, where the memory stores computer instructions, and the processor executes the computer instructions, to enable the computing device to implement the method according to the first aspect and the possible implementations of the third aspect.

According to an eighth aspect, this application provides a computer-readable storage medium. The computer-readable storage medium stores computer instructions, and when the computer instructions in the computer-readable storage medium are executed by a computing device, the computing device is enabled to perform the method according to the second aspect and the possible implementations of the second aspect, or the computing device is enabled to implement functions of the apparatus according to the fourth aspect and the possible implementations of the fourth aspect.

According to a ninth aspect, this application provides a computer-readable storage medium. The computer-readable storage medium stores computer instructions, and when the computer instructions in the computer-readable storage medium are executed by a computing device, the computing device is enabled to perform the method according to the third aspect and the possible implementations of the third aspect, or the computing device is enabled to implement functions of the apparatus according to the fifth aspect and the possible implementations of the fifth aspect.

According to a tenth aspect, this application provides a computer program product including instructions, and when the computer program product runs on a computing device, the computing device is enabled to perform the method according to the second aspect and the possible implementations of the second aspect, or the computing device is enabled to implement functions of the apparatus according to the fourth aspect and the possible implementations of the fourth aspect.

According to an eleventh aspect, this application provides a computer program product including instructions, and when the computer program product runs on a computing device, the computing device is enabled to perform the method according to the third aspect and the possible implementations of the third aspect, or the computing device is enabled to implement functions of the apparatus according to the fifth aspect and the possible implementations of the fifth aspect.

DESCRIPTION OF EMBODIMENTS

To make objectives, technical solutions, and advantages of this application clearer, the following further describes implementations of this application in detail with reference to accompanying drawings.

For ease of understanding of embodiments of this application, the following first describes related application scenarios.

Figure 1:
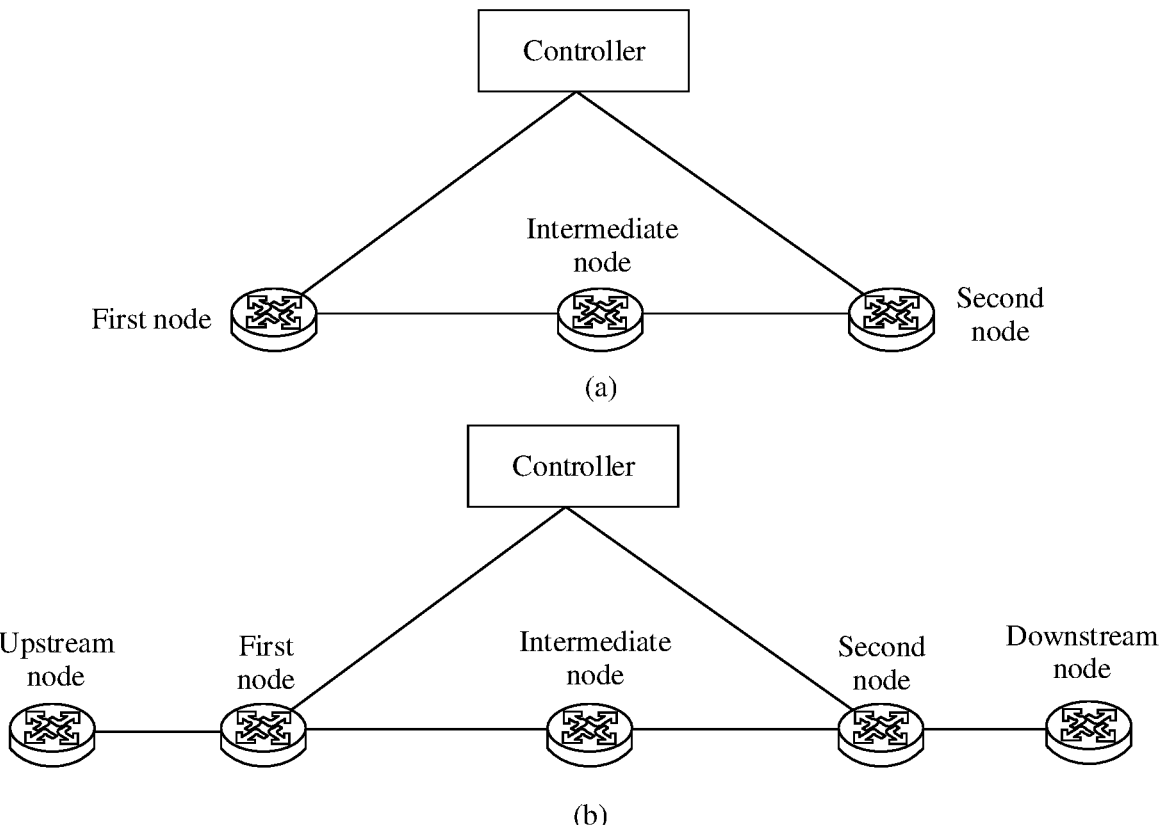
FIG. 1 is a diagram of a structure of a transmission quality detection system according to an example embodiment of this application.

A controller detects transmission quality between a first node and a second node. Another node (which may be referred to as an intermediate node) may exist between the first node and the second node. The first node may be a network device that starts monitoring traffic. The second node may be a network device that stops monitoring traffic. As shown in (a) in FIG. 1, the first node may be a head node of a specific transmission link in a network, and the second node may be a tail node of the specific transmission link in the network. As shown in (b) in FIG. 1, the first node may be an intermediate node of a specific transmission link in the network and/or the second node may be an intermediate node of the specific transmission link in the network (equivalent to that there is an upstream node in upstream of the first node and/or there is a downstream node in downstream of the second node). The transmission quality includes packet loss information (for example, a maximum packet loss rate and an average packet loss rate) between the first node and the second node, flow rate information of the first node, flow rate information of the second node, and the like. The first node and the second node are located in a network at a same layer. For example, the first node and the second node are both located in a layer 2 network, and the first node and the second node are both located in a layer 3 network.

It should be noted that, the upstream node of the first node refers to a node before the first node along the transmission link from the first node to the second node, and the downstream node of the second node refers to a node after the second node along the transmission link from the first node to the second node. In embodiments of this application, "and/or" represents any one of three cases. For example, A and/or B represent any one of three cases: A alone, B alone, or A and B in combination.

Transmission quality detection method may be performed by the first node, the second node, or the controller. The first node and the second node may be nodes in the network, such as a router and a switch. The first node may be a hardware apparatus, for example, a computing device such as a router or a switch that is implemented by using hardware, or may be a software apparatus (for example, may be a set of software programs running on the hardware apparatus). The second node may be a hardware apparatus, for example, a computing device such as a router or a switch that is implemented by using hardware, or may be a software apparatus (for example, may be a set of software programs running on the hardware apparatus).

The controller may be a hardware apparatus, for example, a computing device such as a server or a terminal, or may be a software apparatus (for example, may be a set of software programs running on a hardware apparatus).

Figure 2:
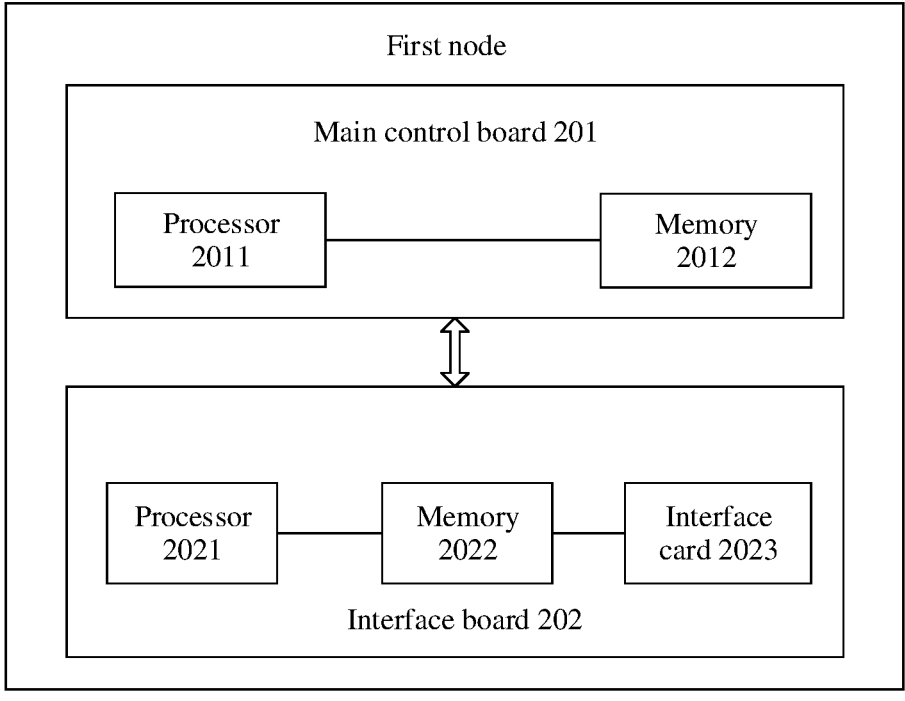
FIG. 2 is a schematic diagram of a structure of a first node according to an example embodiment of this application.

When the first node is a hardware apparatus, as shown in FIG. 2, a schematic diagram of a structure of a router or a switch is provided. The first node includes a main control board 201 and an interface board 202. The main control board 201 includes a processor 2011 and a memory 2012. The interface board 202 includes a processor 2021, a memory 2022, and an interface card 2023. A communication connection is established between the main control board 201 and the interface board 202.

The processor 2011 may be a central processing unit (CPU), an application-specific integrated circuit (ASIC), or the like. The processor 302 may include one or more chips. The memory 2012 may be a read-only memory (ROM), a static storage device, a dynamic storage device, or a random access memory (RAM). The memory 2012 may store computer instructions. When the computer instructions stored in the memory 2012 are executed by the processor 2011, the processor 2011 performs the transmission quality detection method.

The processor 2021 may be a CPU, an application-specific integrated circuit ASIC, or the like. The processor 2021 may include one or more chips. The memory 2022 may be a ROM, a static storage device, a dynamic storage device, or a RAM. The memory 2022 may store computer instructions. When the computer instructions stored in the memory 2022 are executed by the processor 2021, the processor 2021 performs the transmission quality detection method. The interface board 202 may implement packet receiving and sending processing.

Figure 3:
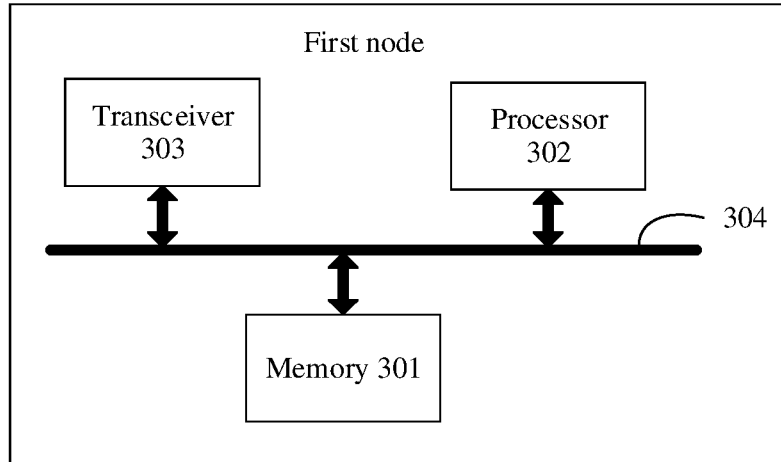
FIG. 3 is a schematic diagram of a structure of a first node according to an example embodiment of this application.

When the first node is a hardware apparatus, as shown in FIG. 3, another schematic diagram of a structure of a router or a switch is further provided. The first node includes a memory 301, a processor 302, a transceiver 303, and a bus 304. The memory 301, the processor 302, and the transceiver 303 are communicatively connected to each other through the bus 304.

The memory 301 may be a ROM, a static storage device, a dynamic storage device, or a RAM. The memory 301 may store computer instructions. When the computer instructions stored in the memory 301 are executed by the processor 302, the processor 302 and the transceiver 303 are configured to perform the transmission quality detection method. The memory may further store data. For example, a part of the memory 301 is used to store data required for the transmission quality detection method, and is used to store intermediate data or result data in a process of program execution.

The processor 302 may be a general-purpose CPU, an application ASIC, a graphics processing unit (GPU), or any combination thereof. The processor 302 may include one or more chips.

The transceiver 303 uses a transceiver module, for example but not for limitation, a transceiver, to implement communication between the first node and another device or a communication network.

The bus 304 may include a path for transmitting information between components (for example, the memory 301, the processor 302, and the transceiver 303) of the first node.

When the second node is a hardware apparatus, a structure of the second node is similar to that of the first node, and details are not described herein again.

Figure 4:
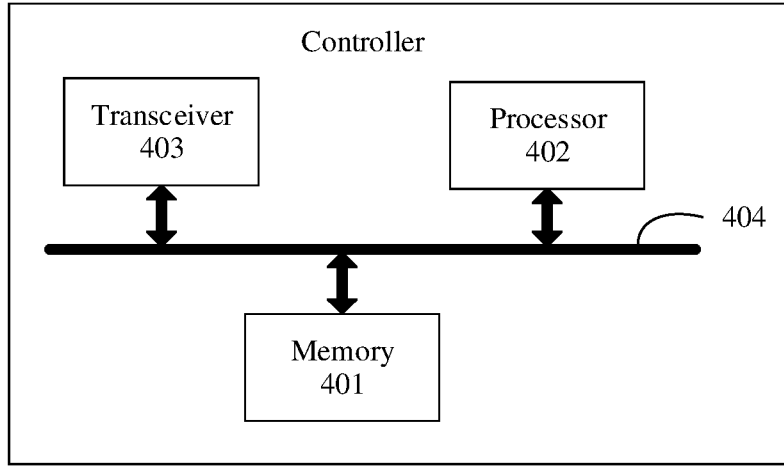
FIG. 4 is a schematic diagram of a structure of a controller according to an example embodiment of this application.

When the controller is a hardware apparatus, as shown in FIG. 4, the controller includes a memory 401, a processor 402, a transceiver 403, and a bus 404. The memory 401, the processor 402, and the transceiver 403 are communicatively connected to each other through the bus 404.

The memory 401 may be a ROM, a static storage device, a dynamic storage device, or a RAM. The memory 401 may store computer instructions. When the computer instructions stored in the memory 401 are executed by the processor 402, the processor 402 and the transceiver 403 are configured to perform the transmission quality detection method. The memory may further store data. For example, a part of the memory 401 is used to store data required for the transmission quality detection method, and is used to store intermediate data or result data in a process of program execution.

The processor 402 may be a general-purpose CPU, an application ASIC, a GPU, or any combination thereof. The processor 402 may include one or more chips.

The transceiver 403 uses a transceiver module, for example but not for limitation, a transceiver, to implement communication between the controller and another device or a communication network.

The bus 404 may include a path for transmitting information between components (for example, the memory 401, the processor 402, and the transceiver 403) of the controller.

Figure 5:
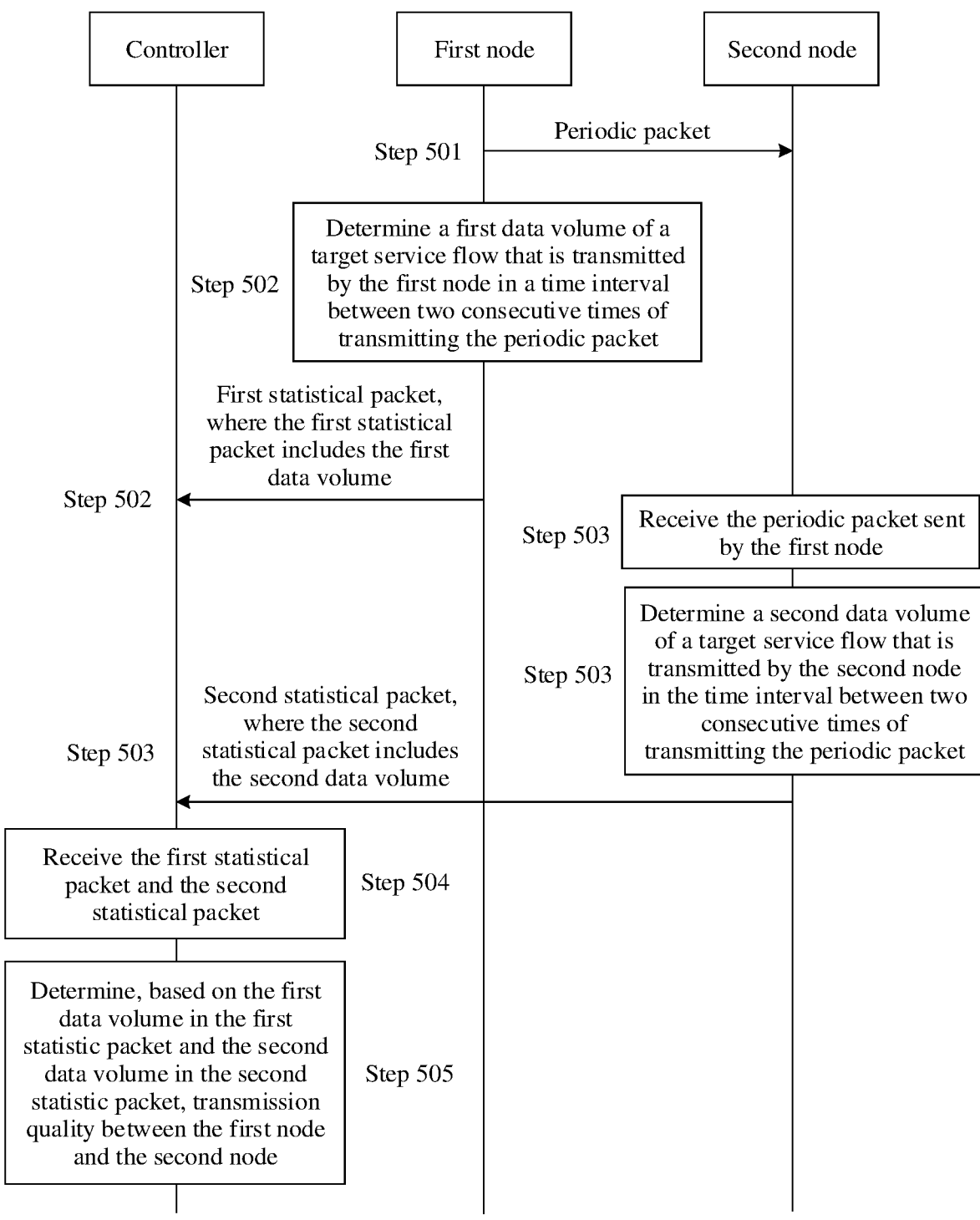
FIG. 5 is a schematic flowchart of a transmission quality detection method according to an example embodiment of this application.

The following describes a procedure of a transmission quality detection method with reference to FIG. 5.

Step 501: A first node sends a periodic packet to a second node. The periodic packet is a packet periodically sent by a node that generates the periodic packet.

The periodic packet may be any periodically sent packet, and may be a packet of a specific protocol type that has been deployed in a network, for example, a hello packet periodically sent by an interior gateway protocol, or a bidirectional forwarding detection (BFD) packet, or a delay heartbeat packet of an in-band flow measurement protocol.

In this embodiment, Manner 1: The first node may generate the periodic packet based on a detection period (for example, 10 seconds), generate the periodic packet at an interval of the detection period, and send the periodic packet to the second node. In this case, a generator of the periodic packet is the first node.

Manner 2: The first node receives a periodic packet periodically sent by an upstream node, and then sends the periodic packet to the second node. In this case, a generator of the periodic packet is the upstream node of the first node.

Step 502: The first node determines a first data volume of a target service flow transmitted by the first node in a time interval for two consecutive times of transmitting the periodic packet, and sends a first statistical packet to the controller. The first statistical packet includes the first data volume.

The target service flow is any service flow to be detected (for example, the target service flow is a service flow that has a high requirement on transmission quality), and is transmitted from the first node to the second node.

In this embodiment, when transmitting the periodic packet for the $i^{th}$ time, the first node starts to determine the first data volume of the target service flow transmitted by the first node in the $i^{th}$ period, where the first data volume includes a quantity of data packets and/or a quantity of bytes of the data packets. When transmitting the periodic packet for the $(i+1)^{th}$ time, the first node determines the first data volume of the target service flow transmitted by the first node from the $i^{th}$ time of transmitting the periodic packet to current time (that is, the $(i+1)^{th}$ time of transmitting the periodic packet) as a first data volume in a time interval from the $i^{th}$ time of transmitting the periodic packet to the $(i+1)^{th}$ time of transmitting the periodic packet (that is, the $i^{th}$ period). In this manner, the first data volume of the target service flow transmitted by the first node in the time interval for two consecutive times of transmitting the periodic packet may be determined.

The first node may send the first statistical packet to the controller, where the first statistical packet carries the first data volume.

It should be noted herein that each time the first node determines the first data volume, the first node may send the first statistical packet that carries the first data volume to the controller, or may periodically send a plurality of first data volumes to the controller, where the plurality of first data volumes are included in one statistical packet. When the plurality of first data volumes are periodically sent, a periodicity number corresponding to each first data volume may be added to the first statistical packet, to mark a time sequence of the first data volume.

Step 503: The second node receives the periodic packet sent by the first node. The second node determines a second data volume of a target service flow transmitted by the second node in a time interval for two consecutive times of transmitting the periodic packet, and sends a second statistical packet to the controller. The second statistical packet includes the second data volume.

In this embodiment, the second node may receive the periodic packet sent by the first node. When transmitting the periodic packet for the $i^{th}$ time, the second node starts to determine the second data volume of the target service flow transmitted by the second node in the $i^{th}$ period, where the second data volume includes the quantity of data packets and/or the quantity of bytes of the data packets. When transmitting the periodic packet for the $(i+1)^{th}$ time, the second node determines the second data volume of the target service flow transmitted by the second node from the $i^{th}$ time of transmitting the periodic packet to current time (that is, the $(i+1)^{th}$ time of transmitting the periodic packet) as the second data volume in a time interval from the $i^{th}$ time of transmitting the periodic packet to the $(i+1)^{th}$ time of transmitting the periodic packet (that is, the $i^{th}$ period). In this manner, the second data volume of the target service flow transmitted by the second node in the time interval for two consecutive times of transmitting the periodic packet may be determined.

The second node may send the second statistical packet to the controller, where the second statistical packet carries the second data volume.

It should be noted herein that each time the second node determines the second statistical packet, the second node sends the second statistical packet to the controller, or may periodically send a plurality of second statistical packets to the controller. When periodically sending the plurality of second statistical packets, the second node may add a periodicity number to the second statistical packet, to mark a time sequence of the second statistical packet.

It should be further noted herein that "transmitting the periodic packet" is used in both step 502 and step 503. In step 502, "transmitting the periodic packet" means receiving the periodic packet or sending the periodic packet. Specifically, "receiving the periodic packet" means that the first node receives the periodic packet from the upstream node of the first node (when the first node has the upstream node, and the first node is not the generator of the periodic packet), and "sending the periodic packet" means that the first node sends the periodic packet to the second node. In step 503, "transmitting the periodic packet" means receiving the periodic packet or sending the periodic packet. Specifically, "receiving the periodic packet" means that the second node receives the periodic packet from the first node, and "sending the periodic packet" means that the second node sends the periodic packet to a downstream node of the second node (when the second node has the downstream node, and the second node is not a final receiver of the periodic packet).

In addition, in step 502 and step 503, the first/second data volume of the transmitted target service flow may be the first/second data volume of the sent target service flow, or may be the first/second data volume of the received target service flow. Specifically, if statistics about transmission quality from an ingress port of the first node to an egress port of the second node need to be collected, the "first data volume of the transmitted target service flow" in step 502 refers to the first data volume of the target service flow received from the ingress port, and the "second data volume of the transmitted target service flow" in step 503 refers to the second data volume of the target service flow sent from the egress port. If statistics about transmission quality from the ingress port of the first node to the ingress port of the second node need to be collected, the "first data volume of the transmitted target service flow" in step 502 refers to the first data volume of the target service flow received from the ingress port of the first node, and the "second data volume of the transmitted target service flow" in step 503 refers to the second data volume of the target service flow received from the ingress port of the second node. If statistics about transmission quality from the egress port of the first node to the ingress port of the second node need to be collected, the "first data volume of the transmitted target service flow" in step 502 refers to the first data volume of the target service flow sent from the egress port, and the "second data volume of the transmitted target service flow" in step 503 refers to the second data volume of the target service flow received from the ingress port of the second node. If statistics about transmission quality from the egress port of the first node to the egress port of the second node need to be collected, the "first data volume of the transmitted target service flow" in step 502 refers to the first data volume of the target service flow sent from the egress port of the first node, and the "second data volume of the transmitted target service flow" in step 503 refers to the second data volume of the target service flow sent from the egress port of the second node.

For example, statistics about transmission quality from the ingress port of the first node to the egress port of the second node are collected. If the transmission quality includes packet loss information, for a time interval between each two consecutive times of transmitting the periodic packet, the first node may determine a quantity of data packets of the target service flow that enter the first node within the time interval, and add the quantity of the data packets to a first statistical packet corresponding to the time interval. For example, the $1^{st}$ time interval is from second 0 to second 10, and the quantity of data packets of the target service flow that enter the first node from second 0 to second 10 is 50. At second 10, the first node adds 50 to the first statistical packet corresponding to the $1^{st}$ time interval.

For the time interval between each two consecutive times of transmitting the periodic packet, the second node may determine a quantity of data packets in the target service flow of the data packets sent by the second node within the time interval, and add the quantity of the data packets to a second statistical packet corresponding to the time interval. For example, the time interval is 10 seconds, the $1^{st}$ time interval is from second 0 to second 10, the first node sends the periodic packet to the second node at second 0, the second node receives the periodic packet at second 0.1, the first node sends the periodic packet to the second node at second 10, the second node receives the periodic packet at second 10.2, a quantity of data packets in the target service flow that are sent by the second node from second 0.1 to second 10.2 is 45, and the second node adds 45 to the second statistical packet corresponding to the $1^{st}$ time interval.

If the transmission quality includes flow rate information, for a time interval between each two consecutive times of transmitting the periodic packet, the first node may determine a quantity of bytes of data packets of the target service flow that enter the first node within the time interval, and add the quantity of bytes of the data packets to a first statistical packet corresponding to the time interval. For example, the $1^{st}$ time interval is from second 0 to second 10, and a quantity of bytes of the data packets that enter the first node from second 0 to second 10 and match an ACL rule in first detection information is 30 bits. At second 10, the first node adds the 30 bits to the first statistical packet corresponding to the $1^{st}$ time interval.

For the time interval between each two consecutive times of transmitting the periodic packet, the second node may determine a quantity of bytes of data packets in the target service flow of the data packets sent by the second node within the time interval, and add the quantity of bytes of the data packets to a second statistical packet corresponding to the time interval. For example, the $1^{st}$ time interval is from second 0 to second 10, the first node sends the periodic packet to the second node at second 0, the second node receives the periodic packet at second 0.1, the first node sends the periodic packet to the second node at second 10, the second node receives the periodic packet at second 10.2, a quantity of bytes of the data packets of the target service flow that are sent by the second node from second 0.1 to second 10.2 is 500 bits, and the second node adds the 500 bits to a second statistical packet corresponding to the $1^{st}$ time interval.

Step 504: The controller receives the first statistical packet sent by the first node, and receives the second statistical packet sent by the second node.

Step 505: The controller determines, based on the first data volume in the first statistical packet and the second data volume in the second statistical packet, transmission quality between the first node and the second node.

In this embodiment, one first statistical packet is determined in the time interval for two consecutive times of transmitting the periodic packet by the first node. One second statistical packet is determined in the time interval for two consecutive times of transmitting the periodic packet by the second node. In this way, each first statistical packet received by the controller may correspond to one second statistical packet (when the statistical packet is not lost). Specifically, there are a plurality of processes to enable the first statistical packet and the second statistical packet to correspond to each other. For example, the first node adds a periodicity number to the first statistical packet when generating the first statistical packet, the second node adds a periodicity number to the second statistical packet when generating the second statistical packet, and the controller may enable the first statistical packet and the second statistical packet that have a same periodicity number to correspond to each other. For another example, the controller may sort the received first statistical packets in ascending order of receiving time, or may sort the received second statistical packets in ascending order of receiving time. The first statistical packet and the second statistical packet of which sorting sequence numbers are the same correspond to each other. Certainly, another manner may be alternatively used. This is not limited in this embodiment of this application.

If the transmission quality includes the packet loss information, the packet loss information may include one or more of a quantity of lost packets, an average packet loss rate, or a maximum packet loss rate. The first statistical packet and the second statistical packet include quantities of data packets. For a time interval for two consecutive times of transmitting the periodic packet, the quantity of data packets included in the first statistical packet is a quantity of data packets that are of the target service flow and that are transmitted by the first node in the time interval, and the quantity of data packets included in the second statistical packet is a quantity of data packets of the target service flow transmitted by the second node in the time interval.

For the time interval for two consecutive times of transmitting the periodic packet, the controller may subtract the quantity of data packets included in the second statistical packet from the quantity of data packets included in the first statistical packet, to obtain a first difference corresponding to the time interval, where the first difference is a quantity of lost packets in the time interval. Then the controller determines a ratio of the first difference to the quantity of data packets included in the first statistical packet corresponding to the time interval, to obtain a packet loss rate corresponding to the time interval. For each time interval, a packet loss rate corresponding to each time interval may be determined in this manner. Then the controller averages packet loss rates corresponding to a plurality of time intervals, to obtain an average packet loss rate of the target service flow between the first node and the second node, and the controller may further determine a largest packet loss rate from the packet loss rates corresponding to the plurality of time intervals, the largest packet loss rate is a maximum packet loss rate of the target service flow between the first node and the second node.

For example, in the Pt time interval, a quantity of data packets included in the first statistical packet is 50, and a quantity of data packets included in the second statistical packet is 45. In the $2^{nd}$ time interval, a quantity of data packets included in the first statistical packet is 60, and a quantity of data packets included in the second statistical packet is 60. In the $3^{rd}$ time interval, a quantity of data packets included in the first statistical packet is 50, and a quantity of data packets included in the second statistical packet is 40. A packet loss rate in the Pt time interval is 10%, a packet loss rate in the $2^{nd}$ time interval is 0%, a packet loss rate in the $3^{rd}$ time interval is 20%, an average packet loss rate of the target service flow between the first node and the second node is 10%, and a maximum packet loss rate is 20%.

When the transmission quality includes the flow rate information, the flow rate information includes a maximum flow rate and/or an average flow rate. The first statistical packet and the second statistical packet include quantities of bytes of data packets. For a time interval for two consecutive times of transmitting the periodic packet, a quantity of bytes of data packets included in the first statistical packet is a quantity of bytes of data packets of the target service flow that are transmitted by the first node in the time interval, and a quantity of bytes of data packets included in the second statistical packet is a quantity of bytes of data packets of the target service flow that are transmitted by the second node in the time interval.

For a time interval between each two consecutive times of transmitting the periodic packet, the controller may determine the quantity of bytes of the data packets included in the first statistical packet, and then divide the quantity of bytes of the data packets included in the first statistical packet by the time interval, to obtain a flow rate in the time interval. Then, the controller calculates an average value of flow rates in a plurality of time intervals, and determines the flow rate as an average flow rate of the target service flow of the first node. In addition, the controller may select a largest value of the flow rates in the plurality of time intervals as a maximum flow rate of the target service flow of the first node. It should be noted herein that, if the first node receives the periodic packet sent by the upstream node, the time interval may not be constant, and a flow rate of the time interval may be obtained by dividing the quantity of bytes of the data packets included in the first statistical packet by the time interval for two consecutive times of transmitting the periodic packet.

For a time interval between each two consecutive times of transmitting the periodic packet, the controller may determine the quantity of bytes of the data packets included in the second statistical packet, and then divide the quantity of bytes of the data packets included in the second statistical packet by a transmission time difference of actually transmitting the periodic packet of the second node within the time interval, to obtain a flow rate in the time interval. Then, the controller calculates an average value of flow rates in a plurality of time intervals, and determines the flow rate as an average flow rate of the target service flow of the second node. In addition, the controller may select a largest value of the flow rates in the plurality of time intervals as a maximum flow rate of the target service flow of the second node. It should be noted herein that the second statistical packet may further include a timestamp. The timestamp is transmission time for the second node to transmit the periodic packet sent by the first node. In this way, the controller may obtain the transmission time from the second statistical packet, to determine a transmission time difference of actually transmitting the periodic packet, and determine the flow rate within the time interval.

In this way, because there is no need to send a quantity of data packets in a detection probe sent by the first node to the second node, and the second node does not need to send a response packet to the first node, even if network quality between the first node and the second node is poor, transmission quality can still be obtained, and detection efficiency may be improved. In addition, because the first node sends the first statistic packet to the controller, and the second node sends the second statistical packet to the controller, the packet loss information can be determined along with the data packet flow without adding any content to the data packet of the target service flow, and transmission efficiency of the target service flow is not affected.

In a possible implementation, after determining the transmission quality, the controller may store the transmission quality in a form of a table. The table may include two columns. One column is specific content of the transmission quality, and the other column is a specific value of the transmission quality.

In a possible implementation, before step 501, the controller may further specify a to-be-detected service flow. Specifically, the controller may send detection information to the first node, where the detection information includes an ACL rule used to indicate a target service flow for which statistics need to be collected. The ACL rule includes one or more of at least one tuple in a 5-tuple, an interface identifier, or a VRF identifier, where the at least one tuple includes a destination IP address. The first node may determine, according to the ACL rule, the first data volume of the target service flow that is indicated by the ACL rule and that is transmitted by the first node in the time interval for two consecutive times of transmitting the periodic packet.

In this embodiment, a user may configure detection information in the controller, where the detection information indicates a service flow for which statistics need to be collected. The detection information may include an ACL rule of the target service flow. The ACL rule may include one or more of at least one tuple in a 5-tuple, an interface identifier, or a VRF identifier, where the at least one tuple includes a destination IP address. It should be noted that, if the ACL rule includes an interface identifier, the target service flow for which statistics need to be collected is a service flow to which a data packet received from an interface indicated by the interface identifier of the first node belongs (where the data packet of the target service flow is received or sent from a specified interface of the second node, so that the second node can detect the target service flow). Alternatively, the target service flow is a service flow to which a data packet sent from an interface indicated by the interface identifier of the first node belongs (where the data packet of the target service flow is received or sent from a specified interface of the second node, so that the second node can detect the target service flow). If the ACL rule includes the VRF identifier, the target service flow for which statistics need to be collected is a service flow to which a data packet forwarded by using the VRF identified by the VRF identifier of the first node belongs.

The controller may send the detection information to the first node, and/or the controller may send the detection information to the second node. The controller may simultaneously send the detection information to the first node, and send the detection information to the second node. Alternatively, the controller may first send the detection information to the first node, and then send the detection information to the second node. This is not limited in this embodiment of this application.

After receiving the detection information, the first node may obtain the ACL rule from the detection information. Then, the first node determines, in the time interval for two consecutive times of transmitting the periodic packet, a data packet that matches the ACL rule and that is in the data packets transmitted by the first node, to determine the first data volume of the target service flow in the time interval. In a corresponding processing process, the first node may record a statistical table, and the statistical table includes transmission time of a periodic packet and a quantity of data packets corresponding to the transmission time. For example, as shown in Table 1, the statistical table includes sending time of a periodic packet and a quantity of data packets corresponding to the sending time, and a detection period is 10 seconds. The first node sends the periodic packet to the second node for the first time at 9:35:05, and the first node sends the periodic packet to the second node for the second time at 9:35:15. In this case, the quantity of data packets matching the ACL rule is 1135. At 9:35:25, the first node sends a periodic packet to the second node for the third time. In this case, the quantity of data packets matching the ACL rule is 1589. At 9:35:35. The first node sends periodic packet to the second node for the fourth time. In this case, the quantity of data packets matching the ACL rule is 235.

TABLE 1

| Sending time of a periodic packet | Quantity of data packets matching an ACL rule |
|---|---|
| 9:35:05 | ~~ |
| 9:35:15 | 1135 |
| 9:35:25 | 1589 |
| 9:35:35 | 235 |
| . . . | . . . |

Certainly, the statistical table of the first node may further include a quantity of bytes of the data packets matching the ACL rule.

After receiving the detection information, the second node may obtain the ACL rule from the detection information. Then, the second node determines, in the time interval for two consecutive times of transmitting the periodic packet, a data packet that matches the ACL rule and that is in the data packets transmitted by the first node, to determine the second data volume of the target service flow in the time interval.

For example, corresponding to Table 1, as shown in Table 2, the statistical table includes receiving time of a periodic packet and a quantity of data packets corresponding to the receiving time, and a detection period is 10 seconds. The second node receives, for the first time at 9:35:07, the periodic packet sent by the first node, and the second node receives, for the second time at 9:35:16, the periodic packet sent by the first node. In this case, the quantity of data packets matching the ACL rule is 1130. The second node receives, for the third time at 9:35:26, a periodic packet sent by the first node. In this case, the quantity of data packets matching the ACL rule is 1489. The second node receives, for a fourth time at 9:35:38, the periodic packet sent by the first node. In this case, the quantity of data packets matching the ACL rule is 234.

TABLE 2

| Receiving time of a periodic packet | Quantity of data packets matching an ACL rule |
|---|---|
| 9:35:07 | ~~ |
| 9:35:16 | 1130 |
| 9:35:26 | 1489 |
| 9:35:38 | 234 |
| . . . | . . . |

Certainly, the statistical table of the second node may further include a quantity of bytes of the data packets matching the ACL rule.

In addition, when the controller detects transmission quality between the other nodes, the ACL rule is also used, and the ACL rule is the same as the ACL rule used by the controller to detect the transmission quality between the first node and the second node. The detection information may further include a detection identifier, and the detection identifier is a unique identifier, used to be included when the first node and the second node subsequently send the statistical packet to the controller. In this way, the controller may determine the statistical packet that carries the detection identifier, to determine the transmission quality between the first node and the second node.

It should be noted that, if the ACL rule is at least one tuple in a 5-tuple, the data packet matching the ACL rule is a packet of which a header includes the at least one tuple.

In a possible implementation, in Manner 1 in step 501, the detection period used by the first node may be sent by the controller to the first node. In this way, the controller may specify a detection period for the first node. Certainly, the controller may alternatively send a detection period to the second node, and the detection period may be used by the second node to determine whether the second node normally receives the periodic packet. For example, if a duration from the last time of receiving the periodic packet by the second node reaches twice the detection period, that the periodic packet is abnormally received may be determined.

In a possible implementation, if Manner 1 is used in step 501, the controller may further specify a packet type of the periodic packet. Specifically, the user may configure a type of the periodic packet in the controller in advance. The controller may send the packet type of the periodic packet to the first node. In Manner 1 in step 501, the first node may generate a periodic packet of the packet type based on the detection period, and send the periodic packet of the packet type to the second node. In addition, the first node may obtain a stored periodic packet of the packet type based on the detection period, and send the periodic packet of the packet type to the second node. In this way, the periodic packet may be flexibly controlled.

In a possible implementation, if Manner 2 is used in step 501, the controller may further specify a packet type of the periodic packet. Specifically, the controller may send the packet type of the periodic packet to the first node. The first node may obtain a periodic packet of the packet type from packets sent by an upstream node, to determine a time interval for two consecutive times of transmitting the periodic packet. In this way, because the first node has the packet type, the periodic packet may be determined. Therefore, the controller may control use of any periodic packet that passes through the first node and the second node, to flexibly implement transmission quality detection.

It should be noted that the packet type is any one of a heartbeat packet type, an interior gateway protocol hello packet type, or a bidirectional forwarding periodic packet type. Certainly, the packet type may alternatively be another type. This is not limited in this embodiment of this application.

In a possible implementation, the controller may further specify a packet type of the periodic packet for the second node. For example, the controller may send the packet type of the periodic packet to the second node. In this way, the second node may use the packet type of the periodic packet to identify the periodic packet from the one or more packets received from the first node, to determine the time interval for two consecutive times of transmitting the periodic packet. Therefore, the controller may control and use any periodic packet that passes through the first node and the second node, and the transmission quality is flexibly detected.

In a possible implementation, the periodic packet sent by the first node to the second node may be lost. In this case, processing performed by the second node may be:

when a duration from the last time of transmitting the periodic packet reaches a target duration, generating a third statistical packet and sending the third statistical packet to the controller the last time; or when a duration from the last time of transmitting the periodic packet reaches a target duration and the periodic packet is transmitted again, generating a third statistical packet and sending the third statistical packet to the controller the last time. The third statistical packet includes abnormality indication information of the periodic packet, the timestamp, and the third data volume of the target service flow transmitted by the second node between the last time of transmitting the periodic packet of the second node and a generation timestamp, and the timestamp is a timestamp for generating the third statistical packet.

The target duration may be preset and stored in the second node.

In this embodiment, the second node may record a time point at which the periodic packet is transmitted each time. If the periodic packet is not transmitted when a duration from the time point reaches a target duration, the second node may generate the third statistical packet. The third statistical packet includes indication information indicating that the periodic packet is abnormal, a timestamp for generating the third statistical packet, and a third data volume of the target service flow transmitted by the second node between the last time of transmitting the periodic packet by the second node and the timestamp. Then, the second node sends the third statistical packet to the controller. In this case, the target duration may be an integer multiple of the detection period. For example, the target duration may be two of the detection period. In this way, when the duration from the last time of transmitting the periodic packet by the second node reaches two of the detection period, the second node may directly generate the third statistical packet, and send the third statistical packet to the controller.

Alternatively, the second node may record a time point at which the periodic packet is transmitted each time. If a duration from the time point reaches a target duration, when the second node transmits the periodic packet again, the second node may generate the third statistical packet. The third statistical packet carries indication information indicating that the periodic packet is abnormal, a timestamp for generating the third statistical packet, and a third data volume of the target service flow transmitted by the second node between the last time of transmitting the periodic packet by the second node and the timestamp. Then, the second node sends the third statistical packet to the controller. In this case, the target duration may be an integer multiple of the detection period. For example, the target duration may be two of the detection period, or may be any duration greater than the detection period. In this way, if the duration from the last time of transmitting the periodic packet reaches the target duration, when the second node transmits the periodic packet again, the second node may generate the third statistical packet, and send the third statistical packet to the controller.

In this way, even if the network quality is poor and the periodic packet is partially lost, the second node can still provide the statistical packet in this period of time for determining the transmission quality.

In a possible implementation, after the controller receives the third statistical packet sent by the second node, processing may be:

receiving the third statistical packet sent by the second node, determining, based on a detection time period corresponding to the third statistical packet, a first statistical packet corresponding to the detection time period, where the detection time period is a time period formed by a timestamp for generating the third statistical packet and a timestamp of a second statistical packet received by the controller for the last time, and determining the transmission quality between the first node and the second node based on the first data volume in the first statistical packet and the third data volume in the third statistical packet that are corresponding to the detection time period.

The first statistical packet and the second statistical packet each includes a timestamp. The timestamp in the first statistical packet is a time point at which the first statistical packet is generated, and the timestamp in the second statistical packet is a time point at which the second statistical packet is generated.

In this embodiment, the controller receives the third statistical packet sent by the second node. The third statistical packet includes indication information indicating that the periodic packet is abnormal, a timestamp for generating the third statistical packet, and a third data volume of the target service flow transmitted by the second node between the last time of transmitting the periodic packet by the second node and the timestamp. The controller obtains a timestamp for generating the third statistical packet from the third statistical packet, and obtains a timestamp for receiving the second statistical packet for the last time. The controller forms the detection time period by using the timestamp for generating the third statistical packet and the timestamp for receiving the second statistical packet for the last time.

Then, the controller may determine the first statistical packet that corresponds to the second statistical packet and that is received for the last time (for example, the first statistical packet having a same periodicity number as the second statistical packet that is received for the last time is the first statistical packet that corresponds to the second statistical packet). The first statistical packet also includes a timestamp for generating the first statistical packet. In this case, the controller may determine the first statistical packet received within the duration of the detection time period that is after the timestamp of the first statistical packet, and determine the first statistical packet as the first statistical packet corresponding to the detection time period. For example, if a timestamp of the first statistical packet corresponding to the second statistical packet that is received for the last time is second 5, and a duration of the detection time period is 10 seconds, a duration of the detection time period that is after the timestamp of the first statistical packet is from second 5 seconds to second 15 (5 seconds+10 seconds).

The controller may add a first data volume in the first statistical packet corresponding to the detection time period to obtain data volume corresponding to the detection time period, and then determine transmission quality between the first node and the second node by using the data volume corresponding to the detection time period and the third data volume in the third statistical packet.

For example, the first data volume and the second data volume each includes a quantity of data packets, the transmission quality includes packet loss information, the detection time period corresponds to three first statistical packets, quantities of data packets included in the three first statistical packets are 30, 20, and 10, a quantity of data packets corresponding to the detection time period is 30+20+10=60, and a quantity of data packets included in the third statistical packet is 30. The controller may subtract the quantity of data packets in the third statistical packet from the quantity of data packets corresponding to the detection time period, to obtain a quantity of lost packets (60–30=30), that is, the quantity of lost packets is 30. The flow rate information is similar to the foregoing descriptions, and details are not described herein again.

In this way, even if the network quality is poor and periodic packets sent by the first node to the second node are partially lost, the transmission quality can still be determined, and impact of the network quality on statistical accuracy is reduced.

It should be further noted that a packet format of the third statistical packet is the same as a packet format of the first statistical packet, except that the third statistical packet further includes abnormal indication information of the periodic packet.

In a possible implementation, before step 501, the controller may further send a detection start notification to the first node and the second node. In this way, the first node may start to send the periodic packet to the second node.

In addition, in this embodiment of this application, delay information may be further detected. The controller determines a second difference between a timestamp of the second statistical packet and a timestamp of the first statistical packet in each of a plurality of detection periods, and determines delay information between the first node and the second node based on the corresponding second difference in each detection period.

The delay information includes an average delay and/or a maximum delay. The first statistical packet further includes the timestamp for generating the first statistical packet, and the second statistical packet further includes the timestamp for generating the second statistical packet.

In this embodiment, for a time interval between each two consecutive times of transmitting the periodic packet, a timestamp included in a first statistical packet corresponding to the time interval is a time point of generating the first statistical packet, and a timestamp included in a second statistical packet corresponding to the time interval is a time point of generating the second statistical packet. After the first node sends the periodic packet to the second node for the first time, the first statistical packet is generated each time the first node sends the periodic packet to the second node subsequently. Therefore, the timestamp of the first statistical packet may be considered as a time point at which the periodic packet is sent. After the second node receives the periodic packet sent by the first node for the first time, the second statistical packet is generated each time the second node receives the periodic packet sent by the first node subsequently. Therefore, the timestamp of the second statistical packet may be considered as a time point at which the periodic packet is received.

For the time interval between each two consecutive times of transmitting the periodic packet, the controller may obtain a second difference by performing subtraction between the timestamp of the second statistical packet and the timestamp of the first statistical packet. Then, the controller averages the second differences for the plurality of time intervals, to obtain an average delay between the first node and the second node.

In addition, the controller determines a largest second difference in the plurality of time intervals as a maximum delay between the first node and the second node.

In a possible implementation, when the controller determines the transmission quality between the first node and the second node, the controller determines that the first statistical packet that is received first and the $1^{st}$ second statistical packet that is received after the first statistical packet are the first statistical packet and the second statistical packet that have a same detection period. Certainly, to prevent a network delay between the first node and the controller and a network delay between the second node and the controller from causing an error in determining the first statistical packet and the second statistical packet that have the same detection period, when the first statistical packet and the second statistical packet include periodicity numbers, the controller may determine the first statistical packet and the second statistical packet that have the same periodicity number as the first statistical packet and the second statistical packet that are corresponding to the same detection period.

In a possible implementation, this embodiment of further provides packet formats of the first statistical packet and the second statistical packet. As shown in Table 3, data content of the first statistical packet includes a quantity of data packets, a quantity of bytes of the data packets, a timestamp (generation time of the first statistical packet), and the like.

TABLE 3

| Type | Content |
| --- | --- |
| Data content | Quantity of data packets<br>Quantity of bytes of the data packets<br>Timestamp |

In addition, the data content in the first statistical packet may further include a detection identifier, a flow direction (outflow or inflow) of a data packet, a detection period, a periodicity number, and the like. The detection period is used to indicate a duration of the detection periodicity. For the first statistical packet, the periodicity number is used to indicate that the first statistical packet is the first statistical packet of a specific periodicity. For the first statistical packet, a flow direction of a data packet is outflow.

The foregoing uses the first statistical packet as an example. A packet format of the second statistical packet is completely the same as the packet format of the first statistical packet, and details of the packet format of the second statistical packet are not described herein again. It should be noted that a flow direction of a data packet in data content of the second statistical packet is inflow. For the second statistical packet, the periodicity number is used to indicate that the second statistical packet is the second statistical packet of a specific periodicity.

Figure 6:
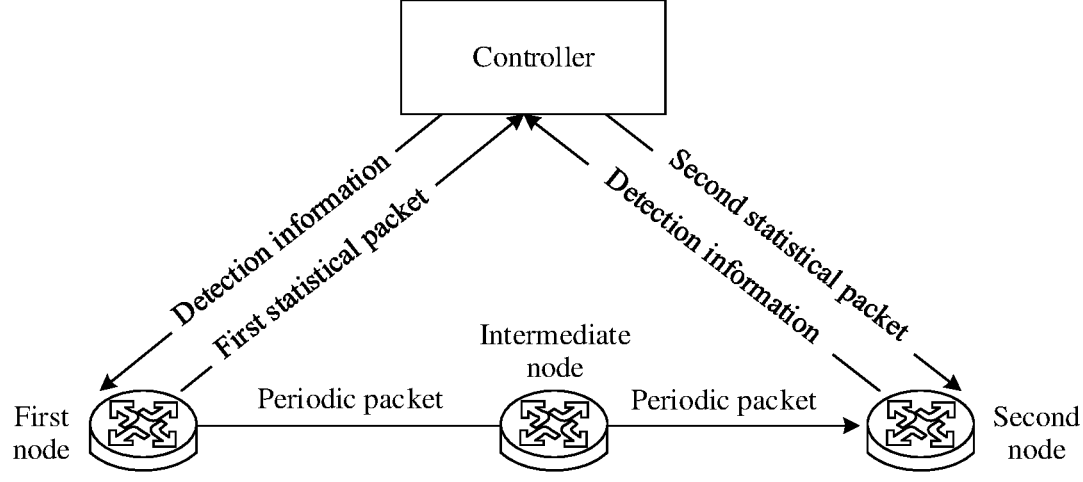
FIG. 6 is a schematic flowchart of a transmission quality detection method according to an example embodiment of this application.

In addition, for ease of understanding embodiments of this application, FIG. 6 further provides a schematic diagram of interaction between a controller and a first node and between a controller and a second node. The controller sends detection information to the first node, the first node sends a first statistical packet corresponding to each detection period to the controller, the controller sends the detection information to the second node, and the second node sends a second statistical packet corresponding to each detection period to the controller.

In addition, in this embodiment, a process in which a network node (where the network node is the first node or the second node) in a network sends a statistical packet to the controller is further provided. The network node transmits a periodic packet, and the network node determines a data volume of a target service flow transmitted by the network node in a time interval for two consecutive times of transmitting the periodic packet, where the data volume includes a quantity of data packets and/or a quantity of bytes of the data packets. The network node sends a statistical packet to the controller, where the statistical packet includes the data volume.

The periodic packet is a packet periodically sent by a node that generates the periodic packet. This process has been described above, and details are not described herein again.

In this embodiment, the first node sends the periodic packet to the second node. The periodic packet is the packet periodically sent by the node that generates the periodic packet. The first node determines a first data volume of a target service flow transmitted by the first node in a time interval for two consecutive times of transmitting the periodic packet, and sends a first statistical packet to the controller. The first statistical packet includes the first data volume. The second node determines a second data volume of a target service flow transmitted by the second node in a time interval for two consecutive times of transmitting the periodic packet, and sends a second statistical packet to the controller. The second statistical packet includes the second data volume. The controller may determine, based on the first data volume in the first statistical packet and the second data volume in the second statistical packet, transmission quality between the first node and the second node. In this way, because there is no need to send a quantity of data packets in a detection probe sent by the first node to the second node, and the second node does not need to send a response packet to the first node, even if network quality between the first node and the second node is poor, transmission quality can still be obtained, and detection efficiency may be improved.

In addition, because the first node and the second node separately collect statistics on the statistical packets of the target service flow, and a detection mark is not included in the data packets of the target service flow, the first node does not need to add the detection mark to each data packet, and the second node does not need to delete the detection mark from each data packet. Data transmission is not affected, and impact on data transmission during transmission quality detection can be reduced. In addition, the periodicity is sent in a process of sending the data packets by the first node and the second node. Therefore, it is equivalent to that the transmission quality is detected along with the service flow, so that the detected transmission quality is more accurate, and an intermediate node does not perceive the detected transmission quality.

Figure 7:
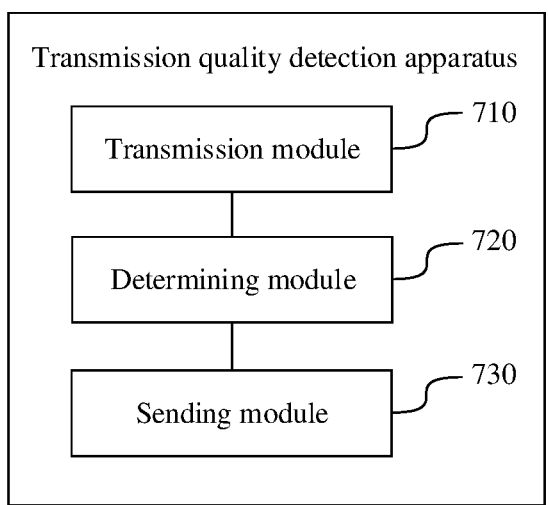
FIG. 7 is a diagram of a structure of a transmission quality detection apparatus according to an example embodiment of this application.

FIG. 7 is a diagram of a structure of a transmission quality detection apparatus according to an embodiment of this application. The apparatus may be implemented as a part of the apparatus or the entire apparatus by using software, hardware, or a combination thereof. The apparatus provided in this embodiment of this application may implement the procedure in embodiments of this application shown in FIG. 5. The apparatus includes a transmission module 710, a determining module 720, and a sending module 730.

The transmission module 710 is configured to transmit a periodic packet, where the periodic packet is a packet periodically sent by a node that generates the periodic packet, and may be further configured to implement a transmission function in step 501 and an implicit step included in step 501.

The determining module 720 is configured to determine a data volume of a target service flow transmitted by the network node in a time interval for two consecutive times of transmitting the periodic packet, where the data volume includes a quantity of data packets and/or a quantity of bytes of the data packets, and may be further configured to implement a determining function in step 502 and step 503 and an implicit step included in step 503.

The sending module 730 is configured to send a statistical packet to a controller, where the statistical packet includes the data volume, and may be further configured to implement sending functions of step 502 and step 503 and implicit steps included in step 502 and step 503.

In a possible implementation, the network node is a first node, and the transmission module 710 is configured to:
receive a periodic packet periodically sent by an upstream node, and send the periodic packet to a second node; or
send the periodic packet to a second node based on a detection period.

In a possible implementation, the network node is a second node.

The transmission module 710 is configured to:
transmit a periodic packet sent by a first node.

The sending module 730 is further configured to:
when a duration since the last time of transmitting the periodic packet reaches a target duration, generate a third statistical packet, and send the third statistical packet to the controller; or
when a duration since the last time of transmitting the periodic packet reaches a target duration and the periodic packet is received again, generate a third statistical packet, and send the third statistical packet to the controller.

The third statistical packet includes abnormal indication information of the periodic packet, a timestamp, and a data volume of a target service flow that is transmitted by the second node between the last time of transmitting the periodic packet and the timestamp, and the timestamp is a timestamp at which the third statistical packet is generated.

In a possible implementation, the transmission module 710 is further configured to receive the detection period sent by the controller.

In a possible implementation, the transmission module 710 is further configured to receive detection information sent by the controller. The detection information may include an ACL rule of the target service flow, where the ACL rule may include one or more of at least one tuple in a 5-tuple, an interface identifier, or a VRF identifier, where the at least one tuple includes a destination IP address.

The determining module 720 is configured to:

determine, according to the ACL rule, the data volume of the target service flow that is indicated by the ACL rule and that is transmitted by the network node in the time interval for two consecutive times of transmitting the periodic packet.

In a possible implementation, the transmission module 710 is further configured to:

receive a packet type of the periodic packet sent by the controller, where the packet type is any one of a heartbeat packet type, an interior gateway protocol hello packet type, or a bidirectional forwarding periodic packet type.

The transmission module 710 is configured to send a periodic packet of the packet type to the second node based on the detection period.

Figure 8:
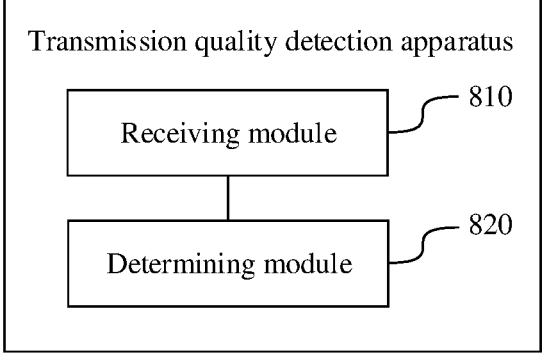
FIG. 8 is a diagram of a structure of a transmission quality detection apparatus according to an example embodiment of this application.

FIG. 8 is a diagram of a structure of a transmission quality detection apparatus according to an embodiment of this application. The apparatus may be implemented as a part of the apparatus or the entire apparatus by using software, hardware, or a combination thereof. The apparatus provided in this embodiment of this application may implement the process in embodiments of this application shown in FIG. 5. The apparatus includes a receiving module 810 and a determining module 820.

The receiving module 810 is configured to: receive a first statistical packet sent by a first node, and receive a second statistical packet sent by a second node, where the first statistical packet includes a first data volume of a target service flow transmitted by the first node within a time interval for two consecutive times of transmitting a periodic packet by the first node, and the second statistical packet includes a second data volume of a target service flow transmitted by the second node within a time interval for two consecutive times of transmitting the periodic packet by the second node, and may be specifically used to implement a receiving function in step 504 and an implicit step included in step 504.

The determining module 820 is configured to determine, based on the first data volume in the first statistical packet and the second data volume in the second statistical packet, transmission quality between the first node and the second node, and may be further configured to implement a determining function in step 505 and an implicit step included in step 505.

Figure 9:
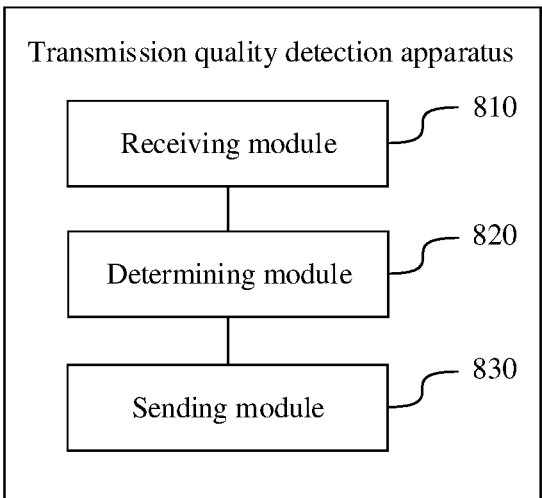
FIG. 9 is a diagram of a structure of a transmission quality detection apparatus according to an example embodiment of this application.

In a possible implementation, as shown in FIG. 9, the apparatus further includes:

a sending module 830, configured to send a packet type of the periodic packet to the first node and/or the second node, where the packet type is any one of a heartbeat packet type, an interior gateway protocol hello packet type, or a bidirectional forwarding periodic packet type.

In a possible implementation, the receiving module 810 is further configured to: receive a third statistical packet sent by the second node, where the third statistical packet includes abnormal indication information of the periodic packet, a timestamp, and a third data volume of the target service flow that is transmitted by the second node between the last time of transmitting the periodic packet by the second node and the timestamp, and the timestamp is a timestamp at which the third statistical packet is generated.

The determining module 820 is further configured to: determine, based on a detection time period corresponding to the third statistical packet, a first statistical packet corresponding to the detection time period, and determine, based on a first data volume in the first statistical packet corresponding to the detection time period and a third data volume in the third statistical packet, transmission quality between the first node and the second node.

Division into the modules in embodiments of this application is an example, and is merely logical function division and may alternatively be other division in actual implementation. In addition, functional modules in embodiments of this application may be integrated into a processor, or each of the modules may exist alone physically, or two or more modules are integrated into a module. The integrated module may be implemented in a form of hardware, or may be implemented in a form of a software functional module.

In the foregoing embodiment, all or part of the software, hardware, firmware, or any combination thereof may be implemented. When the software is used for implementation, all or part of the implementation may be implemented in a form of a computer program product. The computer program product includes one or more computer instructions. When the computer program instructions are loaded and executed on a server or a terminal, all or some of the processes or functions according to embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, and microwave, or the like) manner. The computer-readable storage medium may be any usable medium accessible by a server or a terminal, or a data storage device, such as a server or a data center, integrating one or more usable media. The usable media may be a magnetic medium (for example, a floppy disk, a hard disk drive, a magnetic tape, or the like), an optical medium (for example, a digital video disc (DVD), or the like), or a semiconductor medium (for example, a solid-state drive, or the like).

What is claimed is:

1. A transmission quality detection method performed by a network node, comprising:

transmitting a periodic packet, wherein the periodic packet is sent by a node that generates the periodic packet, wherein the node periodically sends at least one periodic packet to the network node;

determining a data volume of a target service flow transmitted by the network node in a time interval for two consecutive times of transmitting the periodic packet, wherein the data volume comprises at least one of a quantity of a plurality of data packets or a quantity of bytes of the plurality of data packets; and sending a statistical packet to a controller, wherein the statistical packet comprises the data volume, wherein the network node is a second node;

the transmitting a periodic packet comprises:

transmitting a periodic packet sent by a first node, and wherein the method further comprises:

when a duration since the last time of transmitting the periodic packet reaches a target duration, generating a third statistical packet regarding the periodic packet, and sending the third statistical packet to the controller; or when a duration since the last time of transmitting the periodic packet reaches a target duration and the periodic packet is received again, generating a third statistical packet regarding the periodic packet, and sending the third statistical packet to the controller, wherein the third statistical packet comprises abnormal indication information of the periodic packet, a timestamp at which the third statistical packet is generated, and a data volume of a target service flow that is transmitted by the second node between the last time of transmitting the periodic packet and the timestamp.

2. The method according to claim 1, wherein the network node is a first node, and the transmitting a periodic packet comprises:

receiving the periodic packet sent by an upstream node, and sending the periodic packet to a second node, wherein the upstream node periodically sends at least one periodic packet to the network node; or sending the periodic packet to a second node based on a detection period.

3. The method according to claim 2, further comprising: receiving the detection period sent by the controller.

4. The method according to claim 1, further comprising: receiving detection information sent by the controller, wherein the detection information comprises an access control list (ACL) rule of the target service flow, and the ACL rule comprises one or more of at least one tuple in a 5-tuple, an interface identifier, or a virtual routing and forwarding (VRF) identifier, wherein the at least one tuple comprises a destination internet protocol (IP) address; and the determining a data volume of a target service flow transmitted by the network node in a time interval for two consecutive times of transmitting the periodic packet comprises:

determining, according to the ACL rule, the data volume of the target service flow that is indicated by the ACL rule and that is transmitted by the network node in the time interval for two consecutive times of transmitting the periodic packet.

5. The method according to claim 2, further comprising: receiving a packet type of the periodic packet sent by the controller, wherein the packet type is one of a heartbeat packet type, an interior gateway protocol hello packet type, or a bidirectional forwarding periodic packet type; and the sending the periodic packet to a second node based on a detection period comprises:

sending the periodic packet of the packet type to the second node based on the detection period.

6. A transmission quality detection device, comprising:

at least one processor; and a memory, coupled to the at least one processor and configured to store instructions that, when executed by the at least one processor, cause the transmission quality detection device to:

transmit a periodic packet, wherein the periodic packet is a packet periodically sent by a node that generates the periodic packet;

determine a data volume of a target service flow transmitted by the transmission quality detection device in a time interval for two consecutive times of transmitting the periodic packet, wherein the data volume comprises at least one of a quantity of a plurality of data packets or a quantity of bytes of the plurality of data packets; and send a statistical packet to a controller, wherein the statistical packet comprises the data volume, wherein the transmission quality detection device is a second node and when executed by the at least one processor, the instructions further cause the transmission quality detection device to:

transmit a periodic packet sent by a first node, and generate, when a duration since the last time of transmitting the periodic packet reaches a target duration, a third statistical packet regarding the periodic packet, and send the third statistical packet to the controller; or generate, when a duration since the last time of transmitting the periodic packet reaches a target duration and the periodic packet is received again, a third statistical packet regarding the periodic packet, and send the third statistical packet to the controller, wherein the third statistical packet comprises abnormal indication information of the periodic packet, a timestamp at which the third statistical packet is generated, and a data volume of a target service flow that is transmitted by the second node between the last time of transmitting the periodic packet and the timestamp.

7. The transmission quality detection device according to claim 6, wherein the transmission quality detection device is a first node, and when executed by the at least one processor, the instructions further cause the transmission quality detection device to:

receive the periodic packet sent by an upstream node, and send the periodic packet to a second node, wherein the transmission quality detection device periodically sends at least one periodic packet to the transmission quality detection device; or send the periodic packet to a second node based on a detection period.

8. The device according to claim 7, wherein when executed by the at least one processor, the instructions further cause the transmission quality detection device to receive the detection period sent by the controller.

9. The device according to claim 6, wherein when executed by the at least one processor, the instructions further cause the transmission quality detection device to:

receive detection information sent by the controller, wherein the detection information comprises an access control list (ACL) rule of the target service flow, and the ACL rule comprises one or more of at least one tuple in a 5-tuple, an interface identifier, or a virtual routing and forwarding (VRF) identifier, wherein the at least one tuple comprises a destination internet protocol (IP) address; and determine, according to the ACL rule, the data volume of the target service flow that is indicated by the ACL rule and that is transmitted by the transmission quality detection device in the time interval for two consecutive times of transmitting the periodic packet.

10. The device according to claim 7, wherein when executed by the at least one processor, the instructions further cause the transmission quality detection device to:

receive a packet type of the periodic packet sent by the controller, wherein the packet type is one of a heartbeat packet type, an interior gateway protocol hello packet type, or a bidirectional forwarding periodic packet type; and send a periodic packet of the packet type to the second node based on the detection period.

\* \* \* \* \*